United States Patent [19]

Howland et al.

[11] Patent Number: 4,903,495
[45] Date of Patent: Feb. 27, 1990

[54] TRANSPORT REFRIGERATION SYSTEM WITH SECONDARY CONDENSER AND MAXIMUM OPERATING PRESSURE EXPANSION VALVE

[75] Inventors: Leland L. Howland, Belle Plaine; David H. Taylor, Minneapolis; Cynthia J. Satterness, Bloomington, all of Minn.

[73] Assignee: Thermo King Corp., Minneapolis, Minn.

[21] Appl. No.: 310,566

[22] Filed: Feb. 15, 1989

[51] Int. Cl.⁴ .................. F25B 13/00; F25D 21/06
[52] U.S. Cl. .................................. 62/81; 62/196.4; 62/197; 62/224; 62/278; 62/324.6
[58] Field of Search ............ 62/81, 117, 160, 173, 62/196.4, 197, 210, 212, 222, 224, 225, 278, 324.1, 324.4, 324.5, 324.6

[56] References Cited

U.S. PATENT DOCUMENTS

| | | | |
|---|---|---|---|
| 2,734,348 | 2/1956 | Wright | 62/196.4 X |
| 3,203,196 | 8/1965 | Malkoff | 62/196.4 X |
| 3,219,102 | 11/1965 | Taylor . | |
| 3,402,564 | 9/1968 | Nussbaum | 62/173 |
| 3,798,920 | 3/1974 | Morgan | 62/173 |
| 4,306,422 | 12/1981 | Korycki . | |
| 4,325,224 | 4/1982 | Howland . | |
| 4,353,221 | 10/1982 | Taylor . | |
| 4,363,218 | 12/1982 | Nussbaum . | |
| 4,419,866 | 12/1983 | Howland . | |
| 4,517,808 | 5/1985 | Movshovitz et al. . | |
| 4,706,468 | 11/1987 | Howland et al. . | |
| 4,736,597 | 4/1988 | Anderson et al. . | |
| 4,748,818 | 6/1988 | Satterness et al. . | |
| 4,774,813 | 10/1988 | Yokoyama | 62/81 |

Primary Examiner—Harry B. Tanner
Attorney, Agent, or Firm—D. R. Lackey

[57] ABSTRACT

A transport refrigeration system, and method of operating same, in which a maximum operating pressure expansion valve and a secondary condenser are used to enhance hot gas heating cycles initiated to hold a predetermined temperature set point, and hot gas defrost cycles. The secondary condenser is disposed in an evaporator section of the refrigeration system, with hot discharge gas from a compressor being directed to the secondary condenser during heating and defrost cycles. A sufficient supply of refrigerant for heating and defrost cycles is ensured by injecting refrigerant from a receiver and condenser into an active heat cycle refrigerant circuit, when the active refrigerant is insufficient to build the pressure on the low pressure side of the refrigeration system to a value sufficient to close the maximum operating pressure expansion valve and the compressor suction pressure is less than the receiver/condenser pressure.

8 Claims, 2 Drawing Sheets

TRANSPORT REFRIGERATION SYSTEM WITH SECONDARY CONDENSER AND MAXIMUM OPERATING PRESSURE EXPANSION VALVE

TECHNICAL FIELD

The invention relates in general to transport refrigeration systems, and more specifically to methods and apparatus for enhancing the heating and defrosting cycles of such apparatus.

BACKGROUND ART

Transport refrigeration systems commonly employ the hot gas discharge gas from a refrigerant compressor during a heating cycle initiated to hold a predetermined set point temperature in a served space, directing the hot gas to the evaporator during such heating cycle instead of to a condenser. A similar operation takes place during a defrost cycle initiated to melt frost which may have accumulated on the evaporator.

The lower the ambient, the greater the thermal capacity requirement during a heating cycle. Refrigeration systems are designed in an attempt to balance the heat absorbed by an evaporator and the heat rejected by a condenser, as the efficiency is determined by the poorest component. Thus, some systems route radiator coolant from an engine to a heat exchanger wrapped around the accumulator, to add heat to the system. During cold ambients, however, when heat is needed the most, the amount of heat available from radiator coolant drops and hot gas heating and defrosting suffer.

It is an object of the present invention to enhance hot gas heating and hot gas defrosting cycles of a transport refrigeration system, while reducing dependency upon how much heat is absorbed in an accumulator tank.

DISCLOSURE OF THE INVENTION

Briefly, the present invention is a new and improved transport refrigeration system, and method of operating same, in which the normal thermostatic expansion valve is replaced by a thermostatic expansion valve of the type which includes a pressure limiter. This type of valve closes when a predetermined maximum desired operating pressure is reached, and will be hereinafter referred to as a maximum operating pressure valve or MOP valve. In addition to the change in type of expansion device utilized, a secondary condenser is placed in the conditioned air path of an evaporator section of the transport refrigeration system, upstream from the evaporator. A section of tubes in the evaporator, upstream from the remaining coils, may be used, or a separate tube bundle may be used, as desired.

When hot gas heating or defrosting is required, the hot discharge gas from the compressor is diverted from a cooling circuit which includes a condenser and receiver to a heating circuit which includes the secondary condenser. The main or primary condenser and receiver are normally inactive during a heating or defrosting cycle. The secondary condenser is connected into the refrigerant circuit such that as long as the refrigerant in the active heating circuit is adequate to increase the low side pressure to the setting of the MOP valve, the circuit will continue to operate with this supply of refrigerant. Should the supply of refrigerant in the heating circuit be insufficient to close the MOP valve, refrigerant will be drawn from the inactive receiver, and if the receiver supply is inadequate, additional refrigerant will be drawn from the primary condenser. The additional refrigerant from the receiver and/or main condenser is injected into the heating cycle via the open MOP valve.

In one embodiment of the invention, the output of the secondary condenser is connected to the input of the MOP valve, with a check valve being disposed in the liquid line to prevent forcing refrigerant back to the receiver. With sufficient refrigerant in a heating cycle, the secondary condenser supplies the evaporator with low pressure liquid refrigerant via the MOP valve, until the low side pressure reaches the setting of the MOP valve. The MOP valve will close, the low side pressure will drop, the MOP valve opens, and the cycle continues. Should the refrigerant in the heating cycle be insufficient to cyclically close the MOP valve, the low side pressure will continue to be reduced until the check valve is forward biased by a higher pressure in the receiver and/or main condenser. When this occurs, refrigerant will flow from the receiver and/or condenser to the MOP valve until the supply of refrigerant in the heating circuit is sufficient to raise the low side pressure to the setting of the MOP valve.

In another embodiment of the invention, the output of the secondary condenser is connected to the accumulator and the MOP valve senses the low side pressure via an equalizer line. Should the low side pressure be insufficient to close the MOP valve, coupled with the low side or suction pressure being lower than the receiver/condenser pressure, refrigerant from the receiver and/or main condenser will be injected into the heating cycle circuit via the MOP valve and evaporator. The evaporator and MOP valve are otherwise inactive in this second embodiment, unlike the first embodiment in which the MOP valve and evaporator are connected in series with the secondary condenser.

In both embodiments, a normal suction line throttling valve, or crank case pressure regulator (CPR) are not required to limit maximum horsepower requirements during a heating or defrost mode, as this function is automatically taken care of by the MOP valve. Thus, both heating and cooling cycles are enhanced by the elimination of the pressure drops associated with such devices.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

U.S. Pat. Nos. 3,219,102; 4,325,224; and 4,419,866, which are assigned to the same assignee as the present application, describe transport refrigeration systems in detail, and they are hereby incorporated into the specification of the present application by reference.

Figure 1:
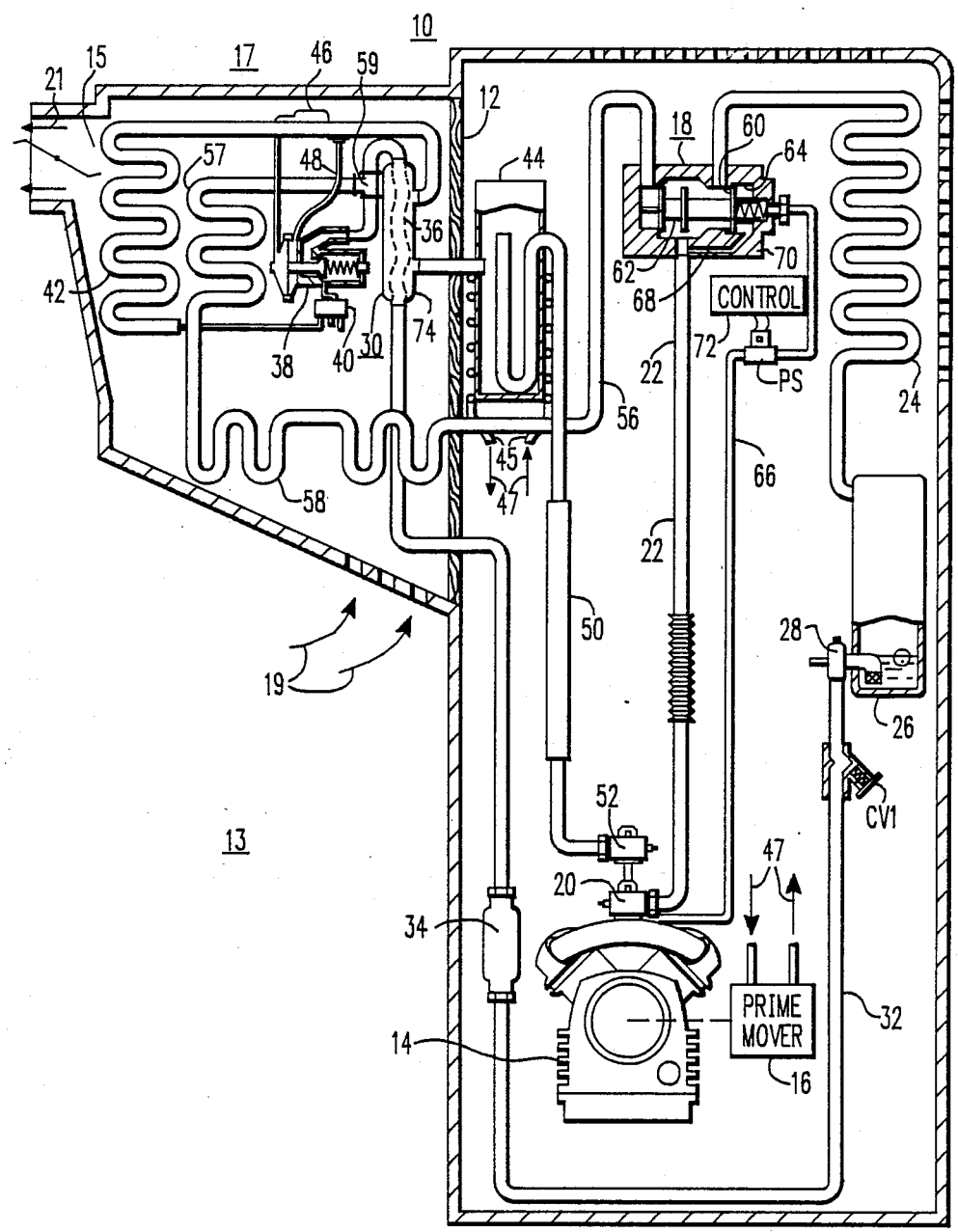
FIG. 1 is a piping diagram of a transport refrigeration system constructed according to a first embodiment of the invention.

Referring now to the drawings, and to FIG. 1 in particular, there is shown a transport refrigeration system 10 constructed according to the teachings of a first embodiment of the invention. Refrigeration system 10 is mounted on the front wall 12 of a truck or trailer which defines a served space 13 containing air to be conditioned by system 10. An air flow path 15 for conditioned air is defined by an evaporator section 17 of system 10, with return air from the served space 13, indicated by arrows 19, being drawn into section 17 by suitable blowers or fans, and then discharged back into the served space 13, with the discharge air being indicated by arrows 21. U.S. Pat. No. 4,736,597, which is assigned to the same assignee as the present application, illustrates an exemplary air delivery system which may be used for trailers, application Ser. No. 197,177, filed May 23, 1988, U.S. Pat. No. 4,811,569, entitled "Zero Cube Transport Refrigeration Unit for Straight Trucks" illustrates an exemplary air delivery system for trucks.

Refrigeration system 10 includes a closed fluid refrigerant circuit which includes a refrigerant compressor 14 driven by a prime mover, such as an internal combustion engine indicated generally at 16. Discharge ports of compressor 14 are connected to an inlet port of a three-way valve 18 via a discharge service valve 20 and a hot gas conduit or line 22. The functions of the three-way valve 18, which has heating and cooling positions, may be provided by separate valves, if desired.

One of the output ports of three-way valve 18 is connected to the inlet side of a condenser coil 24. This port is used as a cooling position of three-way valve 18, and it connects compressor 14 in a first refrigerant circuit. The outlet side of condenser coil 24 is connected to the inlet side of a receiver tank 26. An outlet valve 28 on the outlet side of receiver tank 26 is connected to a heat exchanger 30 via a liquid conduit or line 32 which includes a dehydrator 34. Liquid line 32 also includes a one-way condenser check valve CV1 which enables fluid flow only from the outlet side of receiver tank 26 to the inlet side of heat exchanger 32.

Liquid refrigerant from liquid line 32 continues through a coil 36 in heat exchanger 30 to a thermostatic expansion valve 38. According to the teachings of the invention, thermostatic expansion valve is a maximum operating pressure valve (MOP valve), i.e., a thermostatic expansion valve which includes a pressure limiter. The outlet of expansion valve 38 is connected to a distributor 40 which distributes refrigerant to inlets on the inlet side of an evaporator coil 42. Evaporator 42 is disposed in the conditioned air path 15 of the evaporator section 17. The outlet side of evaporator coil 42 is connected to the inlet side of a closed accumulator tank 44 by way of heat exchanger 30.

Accumulator 44 may be heated, such as via hot radiator coolant from prime mover 16, as indicated by conduit 45 and arrows 47, but the invention makes the efficiency of the refrigeration system less reliant upon heat added to the system via the accumulator 44.

MOP valve 38 is controlled by an expansion valve thermal bulb 46 and an equalizer line 48. Gaseous refrigerant in accumulator tank 44 is directed from the outlet side thereof to the suction port of compressor 14 via a suction line 50, and a suction line service valve 52. The MOP valve 38 divides refrigeration system 10 into a high pressure side which includes the discharge ports of compressor 14, hot gas line 22, condenser 24, receiver 26 and liquid line 32, and a low pressure side which includes distributor 40, evaporator 42, accumulator 44, suction line 50, and the suction port of compressor 14.

The use of MOP valve 38 makes it unnecessary to use a suction throttling valve, or a crankcase pressure regulator, to limit horsepower during heat and defrost, and thus the fact that the system will not experience pressure drops attributable to these devices results in additional enhancements to both the cooling and heating cycles of transport refrigeration system 10.

In the heating position of three-way valve 18, a hot gas line 56 extends from a second outlet port of three-way valve 18 to the inlet side of a secondary condenser 57 via a defrost pan heater 58 located below evaporator coil 42. Secondary condenser 57 may be a separate heat exchanger located upstream in the conditioned air path from evaporator 42, as illustrated in FIG. 1, or it may be 6 to 10 tubes, for example, interposed with evaporator 42 on the upstream side thereof. In other words, the return air 19 first passes in heat exchange relation with the secondary condenser 57, and then with evaporator 42, exiting evaporator section 17 as conditioned air 21.

The conventional by-pass conduit or pressurizing tap, which normally extends from hot gas line 56 to receiver tank 26 via by-pass and service check valves, and the conventional check valve between the condenser and receiver, all of which are shown in FIG. 1 of the incorporated '866 patent, are eliminated by the present invention, as the MOP valve functions to draw refrigerant from the receiver 26 and/or condenser 24, when required, as will be hereinafter explained.

Three-way valve 18 includes a piston 60, a spool 62, and a spring 64. A conduit 66 connects the front or spring side of piston 60 to the intake side of compressor 14 via a normally closed pilot solenoid valve PS. When solenoid operated valve PS is closed, three-way valve 18 is spring biased to the cooling position, to direct hot, high pressure gas from compressor 14 to condenser coil 24. A bleed hole 68 in valve housing 70 allows pressure from compressor 14 to exert additional force against piston 60, to help maintain valve 18 in the cooling position. Condenser coil 24 removes heat from the gas and condenses the gas to a liquid. When evaporator 42 requires defrosting, and also when a heating mode is required to hold the thermostat set point of the load being conditioned, pilot solenoid valve PS is opened via voltage provided by a control function 72. Pressure on piston 60 thus dissipates to the low side of the system. Pressure of the back side of piston 60 then overcomes the pressure exerted by spring 64, and the assembly which includes piston 60 and spool 62 moves, operating three-way valve 18 to its heating position, in which flow of refrigerant to condenser 24 is sealed and flow to secondary condenser 57 is enabled. Suitable control 72 for operating solenoid valve PS is shown in the incorporated patents, such as the control in which the solenoid valve PS is identified with reference 26 in the incorporated '224 patent.

The heating position of three-way valve 18 diverts the hot high pressure discharge gas from compressor 14 from the first or cooling mode refrigerant circuit into a second or heating mode refrigerant circuit which includes defrost pan heater 58, and the secondary condenser 57. The secondary condenser 57, in the first embodiment of the invention, has its outlet connected to the inlet to the MOP valve 38 via a suitable tee 59. The check valve CV1 will prevent fluid flow from the output of secondary condenser 57 towards the receiver 26.

Operation of system 10 during a cooling cycle will be the same as in the prior art, with the exception that it will not suffer a pressure drop due to a suction line throttling valve or CPR. The three-way valve 18 will be in the cooling position, which directs hot gas from compressor 14 to condenser 24, receiver 26, liquid line 32, expansion valve 38, evaporator 42, accumulator 44, and back to compressor 14 via suction line 50.

Operation of system 10 during a heating or defrost cycle is initiated by energizing pilot solenoid PS, to switch three-way valve 18 to the heating position, which directs hot compressor discharge gas to the secondary condenser 57 via hot gas line 56 and the defrost pan heater 58. Initially, the MOP expansion valve 38 will supply low pressure liquid refrigerant to evaporator coil 42. Evaporator coil 42 will heat and evaporate the refrigerant. The refrigerant will continue through a shell 74 surrounding coil 36 of heat exchanger 30 to the accumulator 44. Accumulator 44 will continue to heat the refrigerant and also raise the pressure of the low pressure side. When the pressure of the low pressure side reaches the pressure setting of the MOP valve 38, sensed by the MOP valve in the portion of the refrigeration circuit prior to the heat exchanger and accumulator, MOP valve 38 will close, stopping flow of refrigerant to evaporator 42. The pressure of the low side will then start to drop, the MOP valve 38 will open, refrigerant will again flow into the evaporator 42, the low side pressure will increase, the MOP valve 38 will close, and the cycle will continue.

If, however, the active refrigerant circuit is, or becomes so short of refrigerant that the secondary condenser 57 is not supplying sufficient refrigerant to raise the low side pressure to the MOP setting, the pressure in liquid line 32 will continue to drop until the pressure in receiver tank 26 is greater than the pressure on the other side of check valve CV1, and liquid refrigerant will flow from receiver 26 into MOP valve 38, and thus into the active refrigerant cycle. If the receiver contains an insufficient quantity of refrigerant to build the low side pressure to the MOP setting, the pressure in liquid line 32 will continue to drop until it is lower than the pressure in the main condenser 24, drawing refrigerant from condenser 24 into the active heating cycle. As long as the total refrigerant available in system 10 is insufficient to keep the evaporator pressure higher than the receiver/condenser pressure, refrigerant in the inactive receiver 26 and/or inactive condenser 24 will be injected into the active system through the MOP expansion valve 38, to reactivate the heating cycle. The net heat released into the conditioned air will be the difference between that absorbed by the evaporator 42 and that rejected by the secondary condenser 57, which is equal to the heat of compression, plus any heat added to the refrigerant in the accumulator 44. Thus, the heating cycle is not as dependent upon the amount of heat absorbed by the refrigerant in the accumulator.

Figure 2:
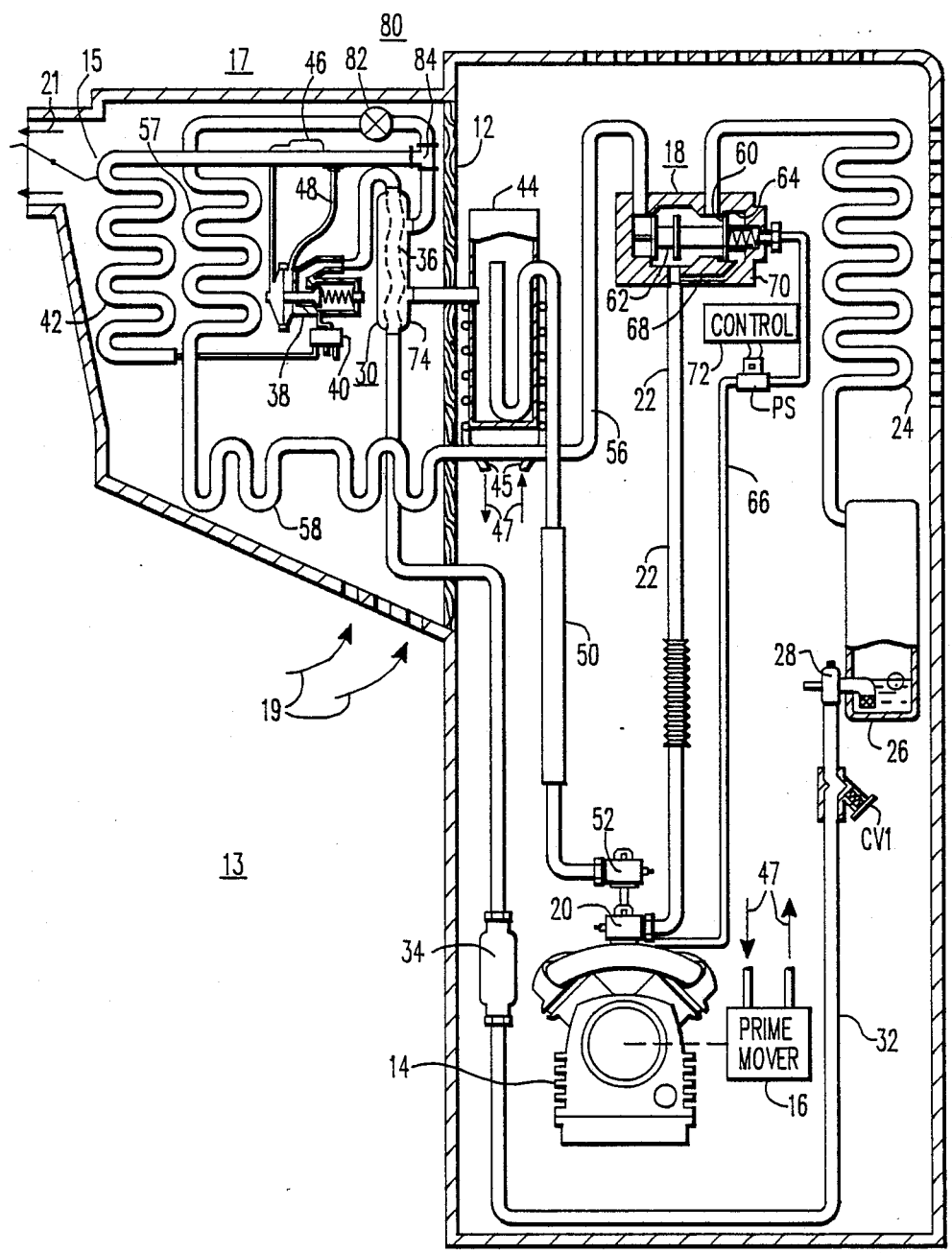
FIG. 2 is a piping diagram of a transport refrigeration system constructed according to a second embodiment of the invention.

FIG. 2 is a piping diagram of a transport refrigeration system 80 constructed according to a second embodiment of the invention. Like reference numerals in FIGS. 1 and 2 indicate like components, and will not be described in detail again. The basic difference between system 80 and system 10 involves where the outlet of the secondary condenser 57 is connected. Instead of connecting the outlet of secondary condenser 57 to the inlet of MOP valve 38, it is connected to the output of evaporator 42 at tee 84 via a conventional thermostatic expansion valve 82, i.e., a thermostatic expansion valve without a pressure limiter. The refrigerant from the secondary expansion valve 82 thus flows to the accumulator 44 via the shell 74 of heat exchanger 30. Since the outlet of secondary condenser 57 is not connected to the liquid line 32, check valve CV1 is not required in this embodiment.

In the operation of system 80, evaporator 42 is not normally in the active heating circuit, as it is in the first embodiment. When system 80 switches to a heating or a defrost cycle, the hot discharge gas from compressor 14 is diverted into the secondary condenser 57, as it is in the first embodiment. Initially, the evaporator 42 will continue to supply low pressure gas to the accumulator 44. The secondary condenser 57 will remove heat from the discharge gas and supply refrigerant in the form of high pressure liquid to the secondary expansion valve 82. The secondary expansion valve 82 will supply low pressure liquid to the accumulator 44. Accumulator 44 will heat and evaporate the low pressure liquid, raising the low side pressure. When the low side pressure exceeds the MOP setting of expansion valve 38, valve 38 will close, stopping flow of refrigerant to the evaporator 42. As long as the secondary expansion valve 82 continues to supply sufficient refrigerant to the heated accumulator, the compressor 14 will continue to supply the secondary condenser 57 with high pressure gas, and the heating or defrosting cycle will continue.

If, however, the active refrigerant system is, or becomes, so short of refrigerant that the secondary condenser 57 cannot supply the secondary expansion valve 82 with liquid refrigerant, the low side pressure will start to fall. As soon as the low side pressure falls below the MOP setting, sensed via the equalizer line 48, MOP valve 38 will open, and when the low side or suction pressure is less than the receiver pressure, high pressure liquid refrigerant will flow from receiver tank 26 to the active system via the open MOP valve 38. If the supply of refrigerant in receiver tank 26 is insufficient to restart the heating or defrost cycle, the low side pressure will continue to fall, transmitted through the open MOP valve 38 to the liquid line 32, until it is lower than the condenser pressure, at which time refrigerant in condenser 24 will flow into the active heating circuit via the open MOP valve 38. Thus, refrigerant will be automatically drawn from the inactive system, i.e., the main condenser 26 and the receiver 28, via MOP valve 38, and injected into the active system through the secondary thermostatic expansion valve 82, to restart a heating or defrost cycle.

In summary, there has been disclosed a new and improved transport refrigeration system, and a method of operating same, in which a MOP valve automatically draws refrigerant from an inactive portion of the system during heating and defrost cycles, if required to sustain such cycles. The invention makes transport refrigeration systems more tolerant of refrigerant charge availability; as long as there is sufficient charge available in the overall system, the disclosed heating cycle will bootstrap itself into an active heating cycle. The invention eliminates the need to pressurize the receiver, eliminating the prior art pressurizing line and check valve, as well as the prior art check valve between the condenser and receiver In the first embodiment, heat is picked up continuously in the evaporator during a heating cycle, making the system less dependent upon heat added in the accumulator Finally, the systems do not require a CPR or suction line throttling valve, which are continuously throttling and adding a pressure drop in prior art systems, which improves low temperature cooling capacity and also enhances the heating capacity of the system.

We claim:

1. A method of enhancing a heating cycle of a refrigeration system which maintains a predetermined set point temperature of a served space via cooling and heating cycles which condition air passed through an air conditioning path of an evaporator section of a refrigeration system which includes a refrigerant disposed in a closed refrigerant circuit having a first active circuit effective during a cooling cycle which includes a compressor, a hot gas line, a condenser, a receiver, a liquid line, an evaporator, an accumulator, and a suction line, and a second active circuit effective during a heating cycle which excludes the condenser and receiver, comprising the steps of:

providing an expansion device between the liquid line and the evaporator to divide the refrigeration system into a high pressure side which includes the condenser and receiver, and a low pressure side which includes the evaporator, accumulator and the suction line which has a suction pressure, providing a secondary condenser in the air conditioning path of the evaporator section, directing hot gas from the compressor to the secondary condenser during a heating cycle, increasing the pressure of the low pressure side, closing the expansion device in response to low side pressure, when there is sufficient refrigerant in the second active circuit to cause the pressure of the low side to increase to a predetermined closing value, and injecting refrigerant into the evaporator from the receiver and condenser via the expansion device when the refrigerant in the second active circuit is insufficient to close the expansion device and the suction pressure is lower than the high side pressure 2. The method of claim 1 including the steps of:
   directing refrigerant from the secondary condenser to the expansion device,
   and preventing refrigerant flow in a direction from the expansion device to the receiver.

3. The method of claim 1 including the steps of:
   directing refrigerant from the secondary condenser to the accumulator,
   and providing a secondary expansion device between the secondary condenser and the accumulator.

4. The method of claim 1 wherein the step of providing a secondary condenser includes the step of positioning the secondary condenser upstream from the evaporator in the air conditioning path of the evaporator section.

5. A transport refrigeration system which maintains a predetermined set point temperature of a served space via cooling and heating cycles which condition air passed through an air conditioning path of an evaporator section of a refrigeration system which includes a refrigerant disposed in a closed refrigerant circuit having a first active circuit effective during a cooling cycle which includes a compressor, a hot gas line, a condenser, a receiver, a liquid line, an evaporator, an accumulator, and a suction line, and a second active circuit effective during a heating cycle which excludes the condenser and receiver, the improvement comprising:

an expansion device disposed between the liquid line and the evaporator, dividing the refrigeration system into a high pressure side which includes the condenser and receiver, and a low pressure side which includes the evaporator, accumulator and the suction line which has a suction pressure, said expansion device being a maximum operating pressure valve which closes at a predetermined pressure, a secondary condenser disposed in the air conditioning path of the evaporator section, valve means operable to direct hot gas from the compressor to the secondary condenser during a heating cycle, which increases the pressure of the low pressure side, said expansion device closing in response to low side pressure, when there is sufficient refrigerant in the second active circuit to cause the pressure of the low side to increase to the predetermined closing value, said expansion device injecting refrigerant into the evaporator from the receiver and condenser when the refrigerant in the second active circuit is insufficient to close the expansion device and the suction pressure is lower than the high side pressure 6. The transport refrigeration system of claim 5 wherein the secondary condenser is connected to direct refrigerant to the expansion device,
   and including a check valve disposed to prevent refrigerant flow in a direction from the expansion device to the receiver.

7. The transport refrigeration system of claim 5 wherein the secondary condenser is connected to direct refrigerant to the accumulator,
   and including a secondary expansion device disposed between the secondary condenser and the accumulator.

8. The transport refrigeration system of claim 5 wherein the secondary condenser is disposed upstream from the evaporator in the air conditioning path of the evaporator section.

* * * * *